United States Patent [19]

Crevasse et al.

[11] Patent Number: 4,716,713

[45] Date of Patent: * Jan. 5, 1988

[54] METHOD AND APPARATUS FOR FORMING NETTED MEAT PRODUCTS WRAPPED IN AN EDIBLE COLLAGEN FILM

[75] Inventors: Gary A. Crevasse, Rochester Hills; David L. Gammon, Rochester; Michael J. Sullivan, Rochester Hills, all of Mich.

[73] Assignee: Naturin-Werk Becker & Co., Fed. Rep. of Germany

[*] Notice: The portion of the term of this patent subsequent to Nov. 11, 2003 has been disclaimed.

[21] Appl. No.: 898,424

[22] Filed: Aug. 20, 1986

Related U.S. Application Data

[62] Division of Ser. No. 724,817, Apr. 18, 1985, Pat. No. 4,621,482.

[51] Int. Cl.$^4$ .................................................. B65B 13/20
[52] U.S. Cl. ...................................... 53/530; 53/258; 53/431
[58] Field of Search ............... 53/429, 439, 449, 465, 53/466, 530, 258, 431, 239; 193/11; 221/63; 426/410, 414

[56] References Cited

U.S. PATENT DOCUMENTS

| | | | |
|---|---|---|---|
| 1,373,812 | 4/1921 | Heath | 193/11 |
| 1,450,104 | 3/1923 | Merli | 53/258 |
| 2,696,443 | 12/1959 | Allbright | 53/439 |
| 2,747,228 | 5/1956 | Braun et al. | 264/147 |
| 3,014,024 | 12/1961 | Liberman et al. | 530/356 |
| 3,290,841 | 12/1966 | Sartore | 53/258 |
| 3,315,299 | 4/1967 | Danielsson | 193/11 |
| 3,344,467 | 10/1967 | Barbu | 17/38 |
| 3,477,860 | 11/1969 | Sartore | 17/49 |
| 3,555,775 | 1/1971 | McMillan | 53/258 X |
| 3,664,849 | 5/1972 | Autry | 426/92 |
| 3,945,171 | 3/1976 | Marietta, Jr. | 53/258 X |

FOREIGN PATENT DOCUMENTS 2476036  8/1981  France .................................. 193/11

OTHER PUBLICATIONS

Article from "Die Fleischwirtschaft" 63 (1983) 5, p. 786 and English translation.

Canadian patent application Ser. No. 487,912 entitled "Use of an Edible Flat Collagen Sheet in the Production of Smoked Foodstuffs, Especially Fish Products and Ham" by Winkler, filed Jul. 31, 1985 claiming priority to W. German patent application No. P 34 31 578.0 filed Aug. 28, 1984.

Advertising of JetNet Corporation entitled "Merchandising Rolled Roasts the JetNet Way".

Primary Examiner—John Sipos
Attorney, Agent, or Firm—Harness, Dickey & Pierce

[57] ABSTRACT

A method and apparatus is disclosed for netting meat products wrapped in an edible collagen film. The apparatus includes a receiving surface into which the meat products are deposited and wrapped with the film. The wrapped meat products are then forced through an extrusion device and into a netting. The apparatus includes a lubrication distribution system for lubricating the surfaces which contact the wrapped meat products. Also associated with the apparatus is a container for storing edible collagen film pieces trimmed to selected lengths and stacked therein.

20 Claims, 7 Drawing Figures

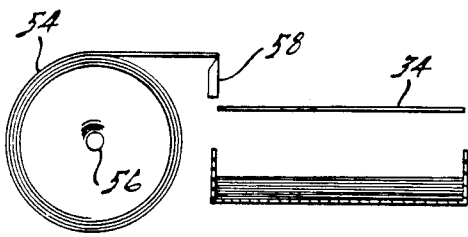
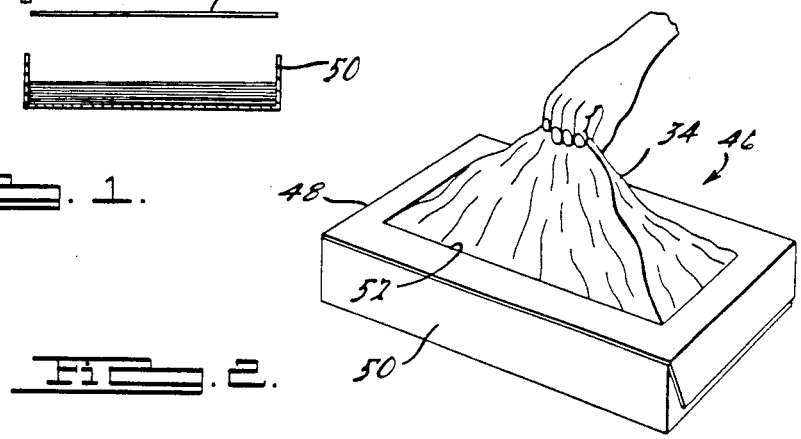
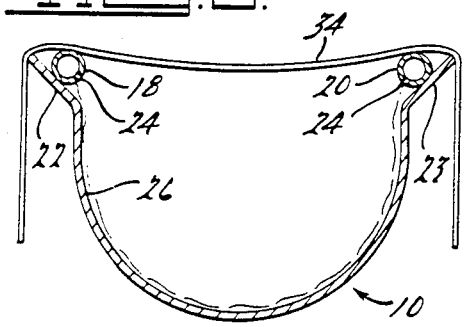
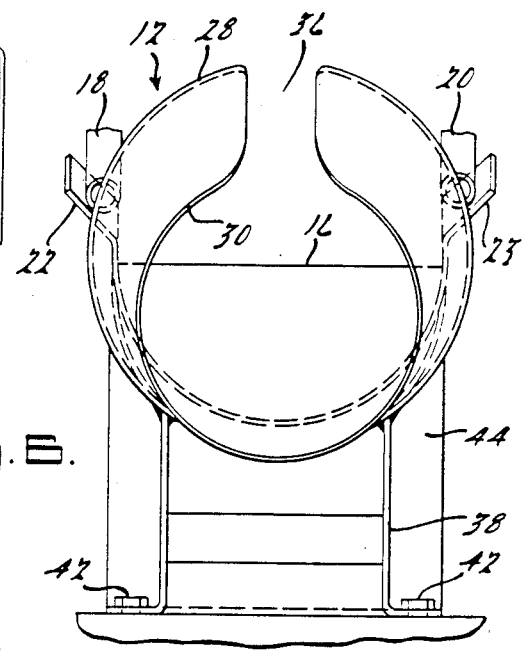
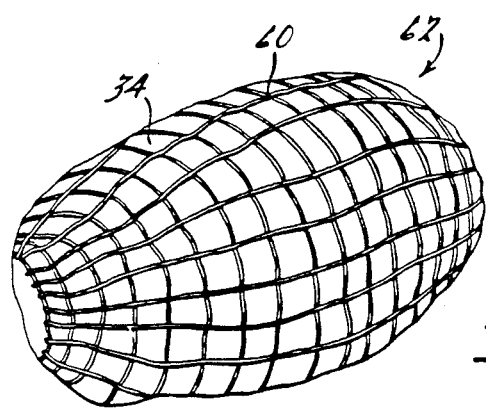

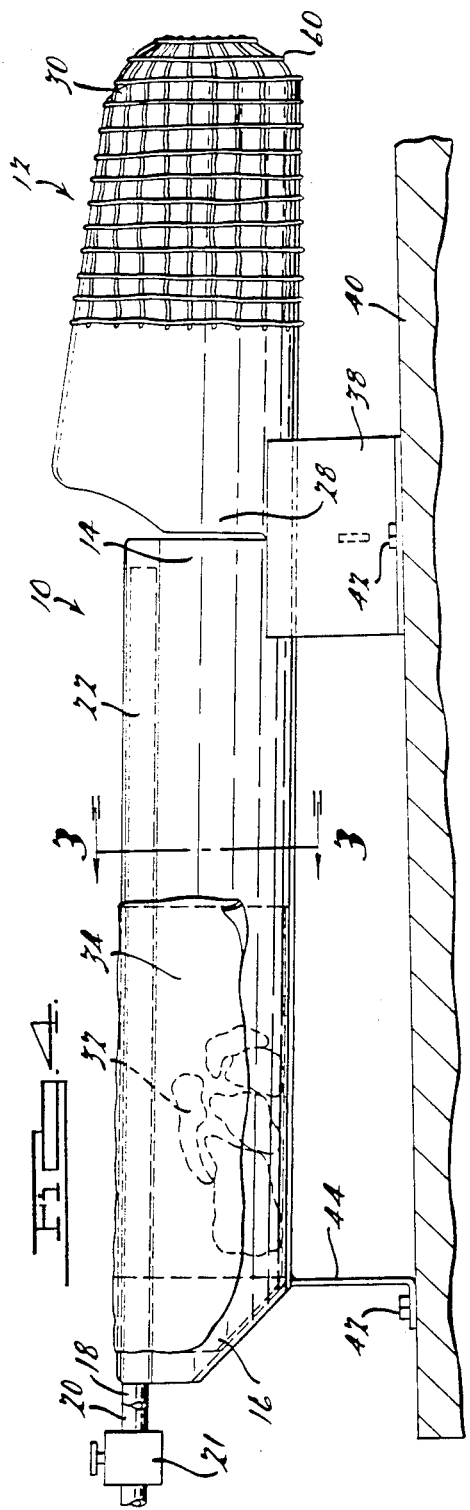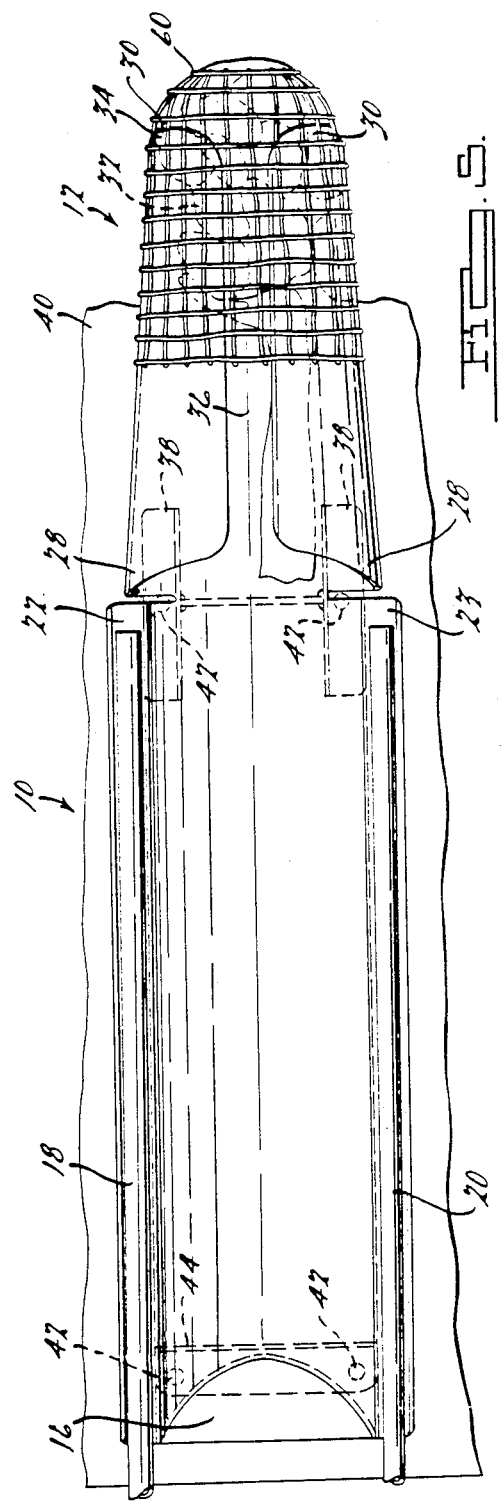

METHOD AND APPARATUS FOR FORMING NETTED MEAT PRODUCTS WRAPPED IN AN EDIBLE COLLAGEN FILM

This is a division U.S. Pat. application Ser. No. 724,817, filed Apr. 18, 1985 now U.S. Pat. No. 4,621,482, entitled "Method and Apparatus for Forming Netted Meat Products Wrapped in an Edible Collagen Film".

TECHNICAL FIELD

The present invention relates to a method for forming netted meat products which are wrapped in an edible collagen film and the products formed thereby. This invention also relates to an apparatus particularly suited to form such products. Lastly, the present invention relates to an apparatus for preparing and storing edible collagen film to be employed with the present invention.

BACKGROUND

In an effort to improve quality, productivity, aesthetics, reduce waste, and provide a compact, discrete product for cooking and serving, it has long been a common practice to bond selected cuts of meats into a single formed product, such as hams. This has been attempted by using various methods and devices, including the use of binders, tieing, pressure forming, and elastic netting. The process of netting generally involves placing selected cuts of meat into an elastic netting. The elastic nature of the netting provides a holding force that keeps the cut surfaces of the meat item in close proximity resulting in a compact, firm unit.

Improvements in the art of netted meat products permit the meat to be uniformly and tightly compacted in the netting. Examples of such devices are disclosed in U.S. Pat. No. 3,344,467 to Barbu and U.S. Pat. Nos. 3,290,841 and 3,477,860 to Satore, which generally comprise a flexible metal sheet formed to the shape of a truncated cone. The smaller end of the cone is surrounded by the netting and the meat portions are deposited into the larger opposing end. Force is then applied to the meat portions which direct same through the cone and into the netting. The truncated cone acts to compact the meat portions into an efficient shape which is retained by the netting. The netted meat product may then be removed from the smaller end of the cone.

The meat item is subsequently cooked or smoked and the netting removed prior to consumption. Removal of the netting generally disrupts the surface of the meat item, because the netting usually is embedded in the meat and often surrounded by meat exudate to the extent that the netting is covered by the exudate. Removal of the netting tears and disrupts the surface of the meat item resulting in yield losses and a very unsightly and unappealing appearance.

It has been known in the art that wrapping meat items in an edible collagen film, prior to the application of the elastic netting, provides a protective barrier that effectively prevents the elastic netting from imbedding into the meat surface. Any exudate issuing from the meat during cooking or processing is contained within the film and does not adhere to the netting and, as a result, the netting is easily removed prior to consumption without disturbing the surface of the meat item.

However, it has been somewhat difficult to wrap the plurality of slippery individual meat pieces with the film and then enclose them with the netting using conventional procedures used in the past that did not employ the film wrap. Attempting to wrap meat products in an edible collagen film and then forcing same through the meat netting apparatus, results in frictional drag between the contacting surfaces of the apparatus and the film. Such friction imposes stress on the film causing the film to be torn or weakened such that it fails upon subsequent physical contact or thermal shock. Further, the known apparatus has been cumbersome to use since there is very little room for spreading the edible collagen film and wrapping the meat products with it. In addition, it is common practice to store edible collagen film on a roll. When a piece of film is desired, an estimated amount of film is unrolled and then cut from the roll. Storing the film in a meat netting environment exposes the film to environmental contaminants, as well as potential physical damage.

DISCLOSURE OF THE INVENTION

The present invention is directed to an apparatus and a method of producing a netted meat product having an edible collagen film disposed between the meat product and the netting. According to one embodiment of the present invention, an apparatus is provided for extruding meat products, wrapped in an edible collagen film into a netting. The apparatus comprises a receiving structure which comprises an open-ended trough portion for receiving a sheet of edible collagen film of sufficient dimension to wrap meat products deposited in the trough on the film. The apparatus further comprises an extruding device which has a first portion open to the trough portion and a second smaller portion for receiving the netting into which the wrapped meat products are extruded. Finally, the apparatus has a lubricating means for distributing a film of lubricant on the surfaces of the receiving and extruding means which contact the edible collagen film during movement of the wrapped meat products into the netting. The lubrication conduits deliver a constant supply of lubricant which flows down the surfaces of the receiving trough and through the extruding means. The lubricant reduces the contact between the peripheral surface of the wrapped meat products and the contacting surfaces of the apparatus, thereby minimizing the stress imposed on the edible collagen film. The lubricant used is preferably water. The lubrication means comprises a pair of lubrication delivery conduits which have perforations located along the axis thereof. The lubrication conduits are secured to the lip portions of the receiving trough.

Individual sheets of the film may be collected and stored in a box-like storage container. The top of the container has an aperture through which individual sheets of edible collagen film may be removed for wrapping the meat products.

In the preferred method, a meat netting is placed over the output side of the extrusion means. Next the lubricant flow is initiated. When the surfaces which contact the edible collagen film wrapper are coated with a film of lubricant, a single piece of edible collagen film is removed from the storage container and placed in the receiving trough. Then meat products are placed upon the film and the film is wrapped therearound. Due to the configuration of the trough, the bottom and most of the sides are automatically wrapped with the film when the meat products are placed thereon thereby facilitating the wrapping step. The wrapped meat is then forced through the extrusion means and into the netting. When the operation is completed the netted meat product may be removed from the extrusion means. The edible collagen film wrapped around the meat product is thereby free from tears and stresses which may cause a subsequent failure of the edible collagen film barrier.

BRIEF DESCRIPTION OF THE DRAWINGS

Additional objects and advantages of the present invention will become apparent by reading the detailed description of the preferred embodiment which makes reference to the following set of drawings:

FIG. 1 is a side view of a device used to unroll a storage roll of the edible collagen film, including a trimming blade, and a cross-sectional view of the bottom portion of a storage container;

FIG. 2 is a perspective view of the storage container showing a single edible collagen film being removed through the aperture located in the top member;

FIG. 3 is a cross-section of an apparatus made in accordance with the teachings of this invention taken along lines 3—3 of FIG. 4, showing an edible collagen film placed in position to receive meat products;

FIG. 4 is a side view of the apparatus with the meat products having been deposited upon the film;

FIG. 5 is a top view of the apparatus with the wrapped meat products being forced into the netting;

FIG. 6 is an end view of the apparatus with no film in place; and

FIG. 7 is a perspective view of the product formed by the present invention.

DESCRIPTION OF THE PREFERRED EMBODIMENT

Referring now to the drawings and especially to FIG. 4, an apparatus for netting meat products is shown having a receiving trough 10 and a meat horn 12. The trough 10 has an open first end 14 and a closed second end provided by wall 16. A pair of distribution conduits 18 and 20 are attached to the uppermost lip portions 22 and 23, respectively, of the trough 10. The conduits 18 and 20 have multiple apertures 24, as seen in FIG. 3, distributed along their axis, which permit lubricant 26 to flow therethrough and onto the inside surface of the trough 10. The conduits 18 and 20 preferably include suitable valves such as valve 21 to control the flow of the lubricant.

The quantity and size of apertures 24 and the lubricant pressure are selected such that an even distribution of lubricant is achieved along the inside surface of the trough 10. The lubricant 26 is preferably water, but may be any fluid which is compatible with the meat products 32 and the edible collagen film 34 and does not leave an undesirable residue on the external surfaces of the apparatus and/or the final netted product.

The trough 10 is preferably constructed of a sheet material, such as stainless steel or plastic. The material selected must have a smooth surface to minimize friction. The trough 10 has a generally U-shaped cross-section and an open top. Thus, the trough 10 is basically a three sided receptacle; two of the sides provided by the opposite lateral walls and the third side by end wall 16. The configuration of trough 10 is of significant importance, because it provides the containment necessary to restrict the movement of the individual meat products. Once the meat products are placed on the film, they sink to the bottom of the trough. This sinking action is virtually a self-wrapping one since the meat products are enveloped on most of its three sides by the film by virtue of the configuration of the trough. Consequently, it becomes a relatively simple procedure for the user to finish wrapping other side and top of the group of meat products.

The meat horn 12 has a generally circular cross-section with a first end 28 connected to the first end 14 of the trough 10. The second end 30 of the meat horn 10 has a generally circular cross-section which is smaller in size than the first end 28 of the meat horn 12 such that the overall shape of the meat horn 12 is that of a truncated cone. The meat horn 12 has a generally tapered profile and therefore acts to form or extrude the meat products 32 forced therethrough. Different sizes of meat horns may be selected for producing products having different shapes and sizes.

The meat horn 12 has a longitudinal slit 36 throughout its length (as best seen in FIG. 5). The meat horn 12 is preferably constructed from a resilient sheet material such as stainless steel or plastic. The material selected should have a smooth surface to minimize friction.

The bottom-most inner surface of the trough 12 and the bottom-most inner surface of the meat horn 10 conform with one another and are sloped sufficiently to cause the lubricant 26, distributed by conduits 18 and 20, to flow therethrough and out the second end 30 of the meat horn 12.

The meat horn 12 and the first end 14 of trough 10 are connected together and supported by a bracket 38 which is secured to the foundation 40 by bolts 42. The bracket 38 is joined to the meat horn 12 and the trough 10 by welding. Bracket 44 supports the second end 16 of trough 10. Bracket 44 is secured to the second end 16 of trough 10 by welding and to the foundation by bolts 42. The dimensional difference between bracket 38 and bracket 44 establishes a slope, which causes the lubricant 26, distributed in trough 10, to flow therethrough and out the second end 30 of meat horn 12. Shims or spacers (not shown) may be used in conjunction with bracket 44 and bracket 38 to provide adjustability in slope and/or account for dimensional irregularities in the surface of foundation 40.

As seen in FIG. 2, the edible collagen film 34 for use with the present apparatus is stored in a container 46 which has a top member 48 hinged to a bottom member 50 which cooperate with one another to form a box-like storage compartment. The top member 48 has an aperture 52 through which individual sheets of edible collagen film 34 may be removed. The container size is dictated by the size of the edible collagen film stored therein. The size of the edible collagen film is determined by the film size required to wrap meat products.

As shown in FIG. 1, the edible collagen film 34 is stored in a roll 54. The edible collagen used is obtained from the corium of a cow's hide. Once the hide is removed from the cow, the outer portion (approximately 2 to 4 mm) is removed for leather production and the inner part is cleared of any meat, fat, or loose connective tissue. The remaining subcutaneous connective tissue, composed of a close network of collagen fibers, is degraded by chemical and mechanical degradation into the form of a pourable aqueous mass. Platicisers and cross-linking agents are added to the aqueous mass which is then placed in uniform thickness onto a suitable conveyor belt which is guided through a drying tunnel. When the aqueous mass dries, it takes on the properties of film, which may be rolled into a storage roll 54. To produce individual sheets of the edible collagen film 34, the storage roll 54 is placed on a spindle 56 and unrolled. While the film is being unrolled, it is trimmed by knife 58 to a desired length. The trimmed film 34 is then stacked in the bottom portion 50 of container 46. When the bottom portion 50 is filled, the top member 48 is placed thereon, thereby providing a sanitary, safe environment for transporting and storing edible collage film for use in the present invention.

The container 46 may be constructed of any material which is capable of withstanding exposure to physical, thermal, and chemical elements and which does not impart an odor, taste, or toxic effect upon the edible collagen film. The top member 48 and the bottom member 50 may be formed of a disposable paper product to eliminate the need to return empty containers from the netting operation to the trimming operation.

To perform the meat netting operation, lubricant flow is initiated and adjusted so that a uniform film is distributed across the inner surfaces of the trough 10. Next, a meat netting 60 is placed over the second end 30 of the meat horn 12. Then a single sheet of edible collagen film 34 is removed from the storage container 46 by grasping and drawing same through aperture 52 (as seen in FIG. 2). The edible collagen film 34 is then placed across the lip portions 22 and 23 of the trough 10 (as seen in FIG. 3). The meat products 32 are then placed upon the edible collagen film 34. The edible collagen film 34 is then wrapped about the meat products 32 and forced through the meat horn 12 into the meat netting 60 (as seen in FIG. 5). Thereupon, the netting 60 is removed from the second end 30 of meat horn 12, resulting in final product 62 (as seen in FIG. 7).

The meat products generally consist of pieces of an animal, such as ham, that are often injected with liquid additives. Thus, the meat products are slippery and difficult to handle and contain in a compact area so that they can be wrapped with the film. However, pursuant to this invention, this can be done quickly and easily since the walls of the trough 10 act to contain the meat products in a compact area and serve to conform the collagen sheet about the bottom and three of the sides of the group of meat products when they fall to the bottom of the trough. It then becomes an easy task for the user to grasp the edges of the sheet and fold them over the top of the meat products to finish the wrapping step. Once wrapped, the lubrication on the surfaces of the apparatus prevent damage to the film as the wrapped meat products are stuffed into the netting. The final netted product 62 is then ready for subsequent processing such as smoking to form smoked hams, beef roasts or the like.

From reading the foregoing specification, those skilled in the art will come to appreciate that it discloses several significant advantages in the meat netting art. The embodiment described is the best mode that is currently contemplated for carrying out the invention. No attempt has been made to list all of the various alternatives and modifications to the general concepts thereof. Such modifications or improvements should become apparent to the skilled practitioner after a study of the drawings, specification, and claims. Therefore, while this invention has been described in connection with a particular example thereof, its true scope should be measured in light of the following claims and equivalents thereto.

I claim:

1. An apparatus for netting meat products wrapped in an edible collagen film comprising:

receiving means including an open ended trough portion having at least two upright side walls and a bottom, the side walls being spaced apart a distance less than the width of a sheet of said edible collagen film of sufficient dimension to wrap said meat products deposited in said trough on said sheet, with said trough being of sufficient dimension so that said film can subsequently be wrapped about said meat products in part by placing the sheet across the walls and putting the meat products on the sheet and allowing the weight of the meat products to fall to the trough bottom thereby partially enveloping the meat products with the sheet;

an extrusion means having a first end with a bottom connected to the bottom of said receiving means, and said extrusion means further including a second end for receiving said netting into which said wrapped meat products may be extruded; and lubrication means on upper portions of the trough side walls for lubricating surfaces of said receiving means and said extruding means which contact said sheet during movement of said wrapped meat products into said netting.

2. The apparatus as in claim 1 wherein said receiving means further includes a rear wall cooperating with lateal sides of the trough to form a three-sided receptacle of sufficient depth to hold a plurality of individual meat product pieces, and wherein said receiving means and said extrusion means are inclined to allow flow of lubricant therethrough.

3. The apparatus as in claim 2 wherein said incline is produced by brackets of different heights supporting said receiving means and said extrusion means.

4. The apparatus as in claim 1 wherein said extrusion means has a surface which contacts said wrapped meat products which has a progressively reduced cross section from said first end toward said second end.

5. The apparatus as in claim 1 wherein said extrusion means comprises a sheet of material formed to the shape of a truncated cone having a continuous longitudinal split therethrough.

6. The invention as in claim 1 wherein said lubricating means comprises at least one perforated lubricant conduit disposed upon said receiving means for delivering lubricant to the surface of said receiving means.

7. The invention as in claim 1 wherein said receiving means has a "U" shaped cross section.

8. The apparatus as in claim 1 wherein said lubricant is water.

9. An apparatus for netting meat products wrapped in an edible collagen film, comprising:

a three-sided receiving trough having an open top portion with the trough being of sufficient dimension for receiving a sheet of said edible collagen film of sufficient size to wrap said meat products deposited in said trough on said film with said film subsequently being wrapped about said meat products, an extrusion member having a generally circular cross-section with a first end connected to said receiving trough, a progressively reduced cross-section from said first end toward a second end, and a continuous longitudinal split therethrough, said extrusion member adapted for receiving a netting into which said wrapped meat products may be extruded; and a lubrication means for lubricating surfaces of said receiving trough and said extrusion member which contacts said film during movement of said wrapped meat products therethrough.

10. The apparatus as in claim 9 wherein said lubrication means comprises at least one perforated lubricant conduit disposed upon said receiving trough for delivering said lubricant to the surface of said receiving trough.

11. The apparatus as in claim 9 wherein said receiving trough and said extrusion member are inclined to allow flow of lubricant therethrough.

12. The apparatus as in claim 9 wherein said lubricant is water.

13. An apparatus for netting meat products wrapped in an edible collagen film comprising:

a storage box having a top and bottom member, said top member having an aperture through which individual sheets of said film, stacked within said box, may be removed;

a receiving structure having an open trough section having at least two upright side walls and a bottom for receiving said film and said meat products deposited thereon, with said trough being of sufficient dimension so that said film can subsequently be wrapped about said meat products at least in part in the receiving structure;

an extrusion device having a first opening defined by a surface connected to the bottom of said receiving structure, a wall member having a progressively reduced cross section which compacts and forms said meat products to a shape generally defined by a second smaller opening in response to forces applied to said meat products to direct same through said extrusion device into said netting; and a lubricating means for lubricating surfaces of said receiving structure and said extrusion device which contact said film during movement of said wrapped meat products into said netting.

14. The apparatus as in claim 13 wherein said receiving structure and said extrusion device are inclined to allow flow of lubricant therethrough.

15. The apparatus as in claim 13 wherein said lubricating means comprises at least one perforated conduit disposed upon said preparation means for delivering lubricant to the surface of said preparation means.

16. The apparatus as in claim 13 wherein said lubricant is water.

17. The apparatus as in claim 13 wherein said storage box is constructed from a disposable paper product.

18. The apparatus of claim 6 wherein a pair of conduits are mounted to upper portions of the side walls of the receiving means and the entire apparatus is tilted towards said second end of the extrusion means whereby the lubricant issuing from the conduits flows over the surfaces of the apparatus to be contacted with said sheet.

19. The apparatus of claim 18 wherein the bottoms of the receiving means and extrusion means are coplanar.

20. The apparatus of claim 19 wherein the length of the receiving means is longer than the length of the extrusion means.

* * * * *